Patented Mar. 25, 1947

2,418,051

UNITED STATES PATENT OFFICE 2,418,051

POLYCYCLIC METHYLPOLYSILOXANES

Donald W. Scott, Schenectady, N. Y., assignor to General Electric Company, a corporation of New York No Drawing. Application September 22, 1945, Serial No. 618,057

5 Claims. (Cl. 260—607)

The present invention relates to novel polycyclic, particularly bicyclic, methylpolysiloxanes and to a method of preparing such polysiloxanes. It is more specifically concerned with, and has as its principal object, the production of novel polycyclic methylpolysiloxanes of the general formula $$(CH_3)_{2(x-n)}Si_xO_{x+n}$$

where $x$ is a whole number equal to at least 5 and not more than 8, and $n$ is a whole number equal to at least one and not more than 3.

In order that the nature of the invention may become apparent, there are listed below representative bicyclic compounds coming within the scope of the invention along with the formulas for these compounds.

(1) Octamethylbicyclo [5.3.1] pentasiloxane

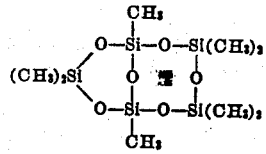

(2) Octamethylspiro [5.5] pentasiloxane

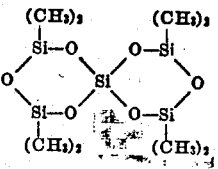

(3) Decamethylspiro [5.7] hexasiloxane

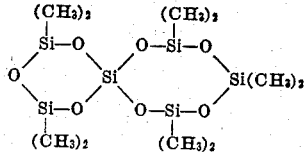

Such compounds are useful for diverse purposes including use as intermediates in the preparation of other polysiloxanes. For example they may be used to introduce predetermined amounts of monomethyl silicon oxide units or silicon oxide units into polysiloxanes such as the polysiloxane fluids or oils of the type described and claimed in the copending application of Winton I. Patnode, S. N. 463,814, filed October 29, 1942, and assigned to the same assignee as the present invention. Thus a suitable mixture of dimethyl silicone, hexamethyl disiloxane and a selected compound of the present invention such as the octamethylbicyclo [5.3.1]-pentasiloxane can be treated with sulphuric acid followed by a washing of the treated products with water as described in the Patnode application to effect a cleavage of the siloxane linkages and a rearrangement of the various units to form a polysiloxane fluid containing known proportions of methyl silicon oxide or silicon oxide units.

I have discovered that these polycyclic compounds and others to be described hereinafter can be prepared by thermal rearrangement of the branched chain methylpolysiloxanes obtained, for example, by cohydrolysis of dimethyldichlorosilane with methyltrichlorosilane or silicon tetrachloride and consisting primarily of dimethyl silicone units

and monomethyl silicon oxide units

or silicon oxide units

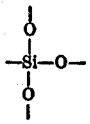

wherein the fourth silicon valence in each case is attached to an oxygen atom.

When the complex condensation products are prepared by the hydrolysis of the mixtures of dimethyldichlorosilane and monomethyltrichlorosilane or silicon tetrachloride, or mixtures of equivalent silicon bromides, the hydrolysis reaction is preferably carried out under conditions such that the formation of insoluble gels is reduced or eliminated. One such process is described and claimed in the copending application S. N. 455,617, filed August 21, 1942, now Patent 2,398,672 in the name of Robert O. Sauer and assigned to the same assignee as the present invention. Briefly described the Sauer process comprises the addition of a solution of the silicon halide mixture in toluene or the like to a hydrolysis medium comprising a mixture of water and a higher alcohol such as butanol. These particular precautions relative to the hydrolysis step are, however, not essential to the preparation of the complex polysiloxanes as they may also be prepared from the corresponding ethoxysilanes containing ethoxy groups in place of halogen atoms. Such compounds, being less readily hydrolyzed than the halides, do not in general give excessive gel formation when solutions thereof are added to water or acidulated water at ordinary temperatures.

The invention will be specifically described with reference to the preparation of the complex polysiloxanes obtained by hydrolysis of suitable silicon chlorides.

An equimolar mixture of dimethyldichlorosilane and methyltrichlorosilane was co-hydrolyzed by slowly adding a mixture of 830 g. of dimethyldichlorosilane, $(CH_3)_2SiCl_2$, 970 g. of methyltrichlorosilane, $CH_3SiCl_3$, and 600 g. of toluene to a vigorously stirred, two phase mixture of six liters of water, 1200 g. of butanol, and 600 g. of toluene. The organic layer was separated from the aqueous phase and the toluene and butanol were removed by distillation under reduced pressure. The co-hydrolysis product so obtained was heated in a Claisen flask through which was passed a slow stream of nitrogen. Up to a liquid temperature of 350° C. no distillate was obtained, but above this temperature thermal rearrangement commenced and distillate came over steadily as the temperature was slowly raised to a final value of 600° C. Approximately two-thirds of the original polymer was converted to volatile material, the remainder being left in the bulb of the Claisen flask as a dark brown, brittle solid.

The distillate was again subjected to fractional distillation followed by fractional crystallization of various distillation fractions to isolate five pure compounds. From the fraction boiling in the range 180° C. to 215° C. at normal pressure, there was obtained a compound having the empirical formula, $(CH_3)_8Si_5O_6$, which was identified as being octamethylbicyclo [5.3.1] pentasiloxane. It had a melting point of 118° C. and a boiling point of 203° C. at normal pressures. Its molecular weight, as determined cryoscopically in cyclohexane, was found to be 361 as compared with the theoretical molecular weight of 356.6.

In addition to a number of monocyclic compounds of the general formula $[(CH_3)_2SiO]_n$, various other bicyclic or polycyclic compounds were also recovered from the various distillation fractions. No definite structural formulas could be assigned to these compounds because of the several isomeric structures which could correspond to each of the empirical formulas. The empirical formulas for these compounds and their melting and boiling points at normal pressure are given in the table.

Table

| Compound Formula | M. P., Deg. C. | B. P., Deg. C. |
|---|---|---|
| $(CH_3)_{10}Si_6O_7$ | 51 | 232 |
| $(CH_3)_8Si_8O_4$ | 119 | 220 |
| $(CH_3)_{10}Si_7O_9$ | 150 | 248 |
| $(CH_3)_{10}Si_8O_{11}$ | 139 | 257 |

To vigorously stirred, two-phase mixture of six liters of water, 1200 g. of butanol, and 600 g. of toluene was added slowly a mixture of 1425 g. (11 moles) of dimethyldichlorosilane, 375 g. (2.2 moles) of silicon tetrachloride, and 600 g. of toluene. The organic layer was separated from the aqueous phase, washed free of acid, and centrifuged to remove a trace of gel. Removal of the butanol and toluene by distillation under reduced pressure left the co-hydrolysis product as a translucent, viscous liquid. This material, when heated in a Claisen flask, behaved much the same as the co-hydrolysis product of dimethyldichlorosilane and methyltrichlorosilane described previously. Thermal rearrangement began at about 375° C. and continued as the temperature was gradually raised to 600° C. The volatile material which distilled over corresponded to about two-thirds of the original co-hydrolysis product, the other third having remained in the bulb of the Claisen flask as a brittle, solid material.

The distillate was subjected to further fractional distillation followed by a fractional crystallization of the appropriate distillation cuts. From one distillation fraction boiling in the range 200° C. to 220° C. at normal pressure there was obtained on fractional crystallization a compound having the general formula $(CH_3)_8Si_5O_6$. This compound boiled at 204° C., had a melting point of 121° C. and a molecular weight of 370 when determined cryoscopically in cyclohexane as compared with the theoretical weight of 356.6. The compound was identified as being octamethylspiro [5.5] pentasiloxane the formula for which is given hereinbefore.

From a second distillation fraction boiling in the range 220° C. to 237° C. at normal pressure, there was obtained on fractional crystallization a compound having the formula $(CH_3)_{10}Si_6O_7$ which boiled at 230° C., melted at 57° C. and was found to have a molecular weight of 429 as compared with a theoretical molecular weight of 430.7. This compound was found to be closely related to the compound boiling at 204° C. and was identified as being decamethylspiro [5.7] hexasiloxane.

In addition to the above compounds, there was also obtained a compound of the empirical formula $(CH_3)_{12}Si_7O_8$ melting at 31° C. and boiling at 254° C. and a compound of the formula $(CH_3)_{14}Si_8O_9$ melting at —12° C. and boiling at 157° C./20 mm. The structural formulas for these polycyclic compounds could not be definitely determined due to possible existence of several isomers for each.

It will be noted that, except for the last three compounds listed in the table, $n$ in the formula $(CH_3)_{2(x-n)}Si_xO_{x+n}$ has a value of one so that the empirical formula for the remaining compounds including those bicyclic compounds whose structural formulas have been determined can be generically represented by the formula $(CH_3)_{2x-2}Si_xO_{x+1}$ wherein $x$ is a whole number equal to at least 5 and not more than 8.

What I claim as new and desire to secure by Letters Patent of the United States, is:

1. A polycyclic methylpolysiloxane having the empirical formula $(CH_3)_{2(x-n)}Si_xO_{x+n}$ where $x$ is a whole number of from 5 to 8 and $n$ is a whole number equal to at least one and not more than 3.

2. A cyclic methylpolysiloxane having the formula $(CH_3)_{2x-2}Si_xO_{x+1}$ where $x$ is a whole number of from 5 to 8.

3. Octamethylbicyclo [5.3.1] pentasiloxane.

4. Octamethylspiro [5.5] pentasiloxane.

5. Decamethylspiro [5.7] hexasiloxane.

DONALD W. SCOTT.